US008903913B2

(12) United States Patent
Somani et al.

(10) Patent No.: US 8,903,913 B2
(45) Date of Patent: Dec. 2, 2014

(54) FACILITATING AND TRACKING PROCESSING OF A MESSAGE THROUGH A WORKFLOW

(75) Inventors: Ajay Somani, Mountain View, CA (US); Ryan da Piedade Menezes, San Francisco, CA (US); Rahul Narayan Iyer, Mountain View, CA (US); Serkan Piantino, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 107 days.

(21) Appl. No.: 13/564,531

(22) Filed: Aug. 1, 2012

(65) Prior Publication Data

US 2014/0040386 A1 Feb. 6, 2014

(51) Int. Cl.
*G06F 15/16* (2006.01)
(52) U.S. Cl.
USPC .......................................... 709/204; 709/219
(58) Field of Classification Search
CPC ............................. G06F 15/16; H04L 12/588
USPC .................................................. 709/206, 224
See application file for complete search history.

(56) References Cited

U.S. PATENT DOCUMENTS

2006/0271784 A1* 11/2006 Bolosky et al. ............... 713/170
2011/0225293 A1* 9/2011 Rathod ......................... 709/224

* cited by examiner

*Primary Examiner* — David Lazaro
*Assistant Examiner* — Zia Khurshid
(74) *Attorney, Agent, or Firm* — Fenwick & West LLP (57) ABSTRACT

A message tracking engine facilitates processing of a message through a determined workflow. In particular, the message tracking engine may route the message to various services in an order specified by the workflow. During processing, the message tracking engine tracks the progress of the message through the workflow. If any issues are encountered, the message tracking engine handles the encountered issues. In one aspect, the message tracking engine facilitates performance of one or more synchronous processing steps of the workflow during a first phase. Following the first phase, the message tracking engine serializes one or more asynchronous processing steps of the workflow to a storage device. After serializing the asynchronous processing steps, the message tracking engine facilitates performance of the asynchronous processing steps during a second phase.

20 Claims, 3 Drawing Sheets

FACILITATING AND TRACKING PROCESSING OF A MESSAGE THROUGH A WORKFLOW

BACKGROUND

This invention generally pertains to social networking, and more specifically to facilitating and tracking the processing of a message through a workflow.

Social networks, or social utilities that track and enable connections between users (including people, businesses, and other entities), have become prevalent in recent years. In particular, social networking systems allow users to communicate information more efficiently. For example, a user may post contact information, background information, job information, hobbies, and/or other user-specific data to a location associated with the user on a social networking system. Other users can then review the posted data by browsing user profiles or searching for profiles including specific data. The social networking systems also allow users to associate themselves with other users, thus creating a web of connections among the users of the social networking system. These connections can be used by various users to communicate through the exchange of various types of messages. For example a first user may send a chat message to another user who is connected to the first user.

In order to process and deliver such messages, social networking systems typically route the messages to several different services. Such processing, however, often occurs in a decentralized manner. For example, a chat message received by a social networking system may need to be filtered for SPAM and translated into a particular language prior to being delivered to a specific destination. In processing the chat message, the social networking system may first route the message to a SPAM service. After the chat message is filtered for SPAM, the SPAM service may route the message to a translation service. After translation of the chat message, the translation service may route the message to a delivery service.

One problem with such a decentralized routing scheme is that when a service fails or improperly processes a message, the message may be inadvertently lost or dropped. Referring again to the previous example, if the SPAM service improperly processes the chat message, the message may never be sent to the translation service or the delivery service. As a result, the message may never be delivered. As a consequence of the outlined problem, current social networking systems are unable to reliably process and deliver messages.

SUMMARY

Embodiments of the invention provide a centralized message tracking engine for facilitating and tracking the processing of messages through a workflow. In one embodiment, the message tracking engine receives job requests from one or more client devices. Each job request may specify that a message included in the request be processed. Upon receiving a job request, the message tracking engine assumes ownership or responsibility for the request. In assuming ownership, the message tracking engine determines a specific workflow to be used to process the message of the request. The determined workflow may specify the manner and order in which the message is to be processed by one or more services of the social networking system.

In one embodiment, the determined workflow may include a set of ordered synchronous processing steps and/or a set of ordered asynchronous processing steps. As used herein, a synchronous processing step may refer to a processing step that must be completed prior to returning a response to a client device. An asynchronous processing step may refer to a processing step that is not required to be completed prior to returning a response to a client device. For example, a client device may request that a particular chat message be delivered to a user's mobile phone via SMS messaging. In such an example, a synchronous processing step may be a step for sending the chat message to the indicated mobile phone. An asynchronous processing step may be a step for storing the chat message in an archive for long term storage.

In one embodiment, the message tracking engine facilitates processing of the message through the determined workflow. In particular, the message tracking engine may send or route the message to various services in the order specified by the determined workflow. During processing, the message tracking engine may track the progress of the message through the workflow. If any issues are encountered, the message tracking engine handles the encountered issues such that processing of the message can be successfully completed through the workflow.

In one embodiment, the message tracking engine facilitates performance of the synchronous processing steps for the workflow during a first processing phase. Following the first processing phase, the message tracking engine serializes the job request and any asynchronous processing steps for the workflow to a job store. In doing so, the asynchronous processing steps can be completed in the event the message tracking engine is restarted. After serializing the job request and any asynchronous steps, the message tracking engine facilitates performance of the asynchronous processing steps during a second processing phase.

By centrally facilitating and tracking the processing of messages through various workflows, embodiments enable the messages to be successfully processed without being inadvertently dropped. In this way, messages between users of a social networking system can be reliability handled and delivered. As a result, overall communications between users in the social networking system can be improved.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the system. In use, users join the social networking system and then add connections to a number of other users to whom they desire to be connected. As used herein, the term "friend" refers to any other user to whom a user has formed a connection, association, or relationship via the system. Connections may be added explicitly by a user, for example, the user may select a particular other user to be a friend, or may be automatically created by the social networking site based on common characteristics of the users (e.g., users who are alumni of the same educational institution). Connections in social networking systems are usually in both directions, but need not be, so the terms "user" and "friend" depend on the frame of reference. For example, if Bob and Joe are both users and connected to each other in the system, Bob and Joe are also each other's friends. The connection between users may be a direct connection; however, some embodiments of a social networking system allow the connection to be indirect via one or more levels of connections. Also, the term friend need not require that users actually be friends in real life, (which would generally be the case when one of the users is a business or other entity); it simply implies a connection in the social networking system. In some instances, users may communicate with other users over the social networking system. For example, friends can have a live conversation with one another by exchanging chat messages, email messages, SMS messages, etc.

In one embodiment, a social networking system includes a message tracking engine for centrally facilitating and tracking the processing of messages exchanged between users of the system. In the embodiment, job requests that include various user messages are received by the message tracking engine from one or more client devices. In receiving the messages, the message tracking engine assumes ownership or responsibility for processing of the messages. In do so, the message tracking engine can ensure that the messages are successfully handled by the social networking system.

In one aspect, after receiving an individual job request, a processing module of the message tracking engine determines a processing workflow for a message of the received request. The workflow may specify the services to be employed in processing the message. The workflow may additionally specify an order or progression in which the received message is to be processed. In determining the workflow, the message tracking engine may identify a set of synchronous processing steps and a set of asynchronous processing steps.

After determining the workflow for the message, the processing module facilitates the performance of the synchronous processing steps of the workflow. In particular, the processing module may route the message to one or more services according to the synchronous processing steps. For example, the processing module may route the message to a first service specified by the synchronous processing steps. After processing by the first service, the processing module may route the message to a subsequent service specified by the synchronous processing steps.

In routing the message to the one or more services, the processing module may utilize one or more service modules of the message tracking engine. Each service module may include various mechanisms (e.g., API calls, routines, etc.) for connecting to and/or interacting with a particular service. For example, a service module for a SPAM service may include a routine for formatting a message such that the message can be processed by the SPAM service.

In one embodiment, the processing module additionally tracks the processing of the message to ensure that the message is properly handled by each service. If processing of the message is not properly handled by a service, the processing module may initiate a recovery operation such that the message can be progressed through the workflow. For example, the processing module may resend the message to a service that failed to properly process the message. Alternatively, the processing module may send the message to a subsequent service as indicated by the workflow without resending the message to the failing service.

Following completion of the synchronous processing steps, a persistence module of the messaging tracking engine serializes the job request and any identified asynchronous processing steps to a job store. By serializing the job request and asynchronous processing steps, the processing of the job request can be finished even if the message tracking engine is restarted prior to completion of the job request. More specifically, because asynchronous processing steps may occur a relatively long period after a job request is received, the probability of the message tracking engine restarting prior to completion of the asynchronous steps is relatively high. By serializing the job request and any associated asynchronous processing such restarts can be prevented from adversely impacting the processing of the job request's message.

After serializing the job request and any asynchronous processing steps, a response is provided to the client device that requested processing of the message. The response can indicate that processing of the message has been handled. After providing the response, the processing module facilitates performance of the asynchronous processing steps. In particular, the message tracking engine may route the message to one or more services according to the asynchronous processing steps. The processing module may utilize the one or more service modules in routing the message to the one or more services. The message tracking engine may additionally track the processing of the message and handle any identified issues with the processing.

By centrally owning the processing of messages and by serializing job requests, embodiments enable messages to be successfully processed until completion. As a result, the inadvertent loss or dropping of messages during processing can be prevented. More specifically, current social networking systems do not assign ownership of messages to a single entity. Rather, messages are generally passed from one service to the next in a decentralized manner (i.e. without any one service having the responsibility to ensure that messages are successfully handled through an entire workflow). As a result, messages are often dropped when a service in the workflow fails or is restarted. Through utilizing a message tracking engine in the manner described herein, embodiments enable the centralized management and monitoring of messages through various processing workflows. As a result, communications in a social networking system may be made more reliable and timely.

Embodiments further enable statistics relating to the processing of the messages to be collected. More specifically, because current social networking systems process messages in a decentralized manner, statistics regarding the services that process the messages are often difficult to gather and/or aggregate. For example, determining the average time to complete a particular workflow can be difficult because the statistics for various services are generally collected separately and stored in an inconsistent manner (e.g., in different formats). By employing a centralized message tracking engine, embodiments enable statistics to be quickly and consistently collected and aggregated.

Figure 1:
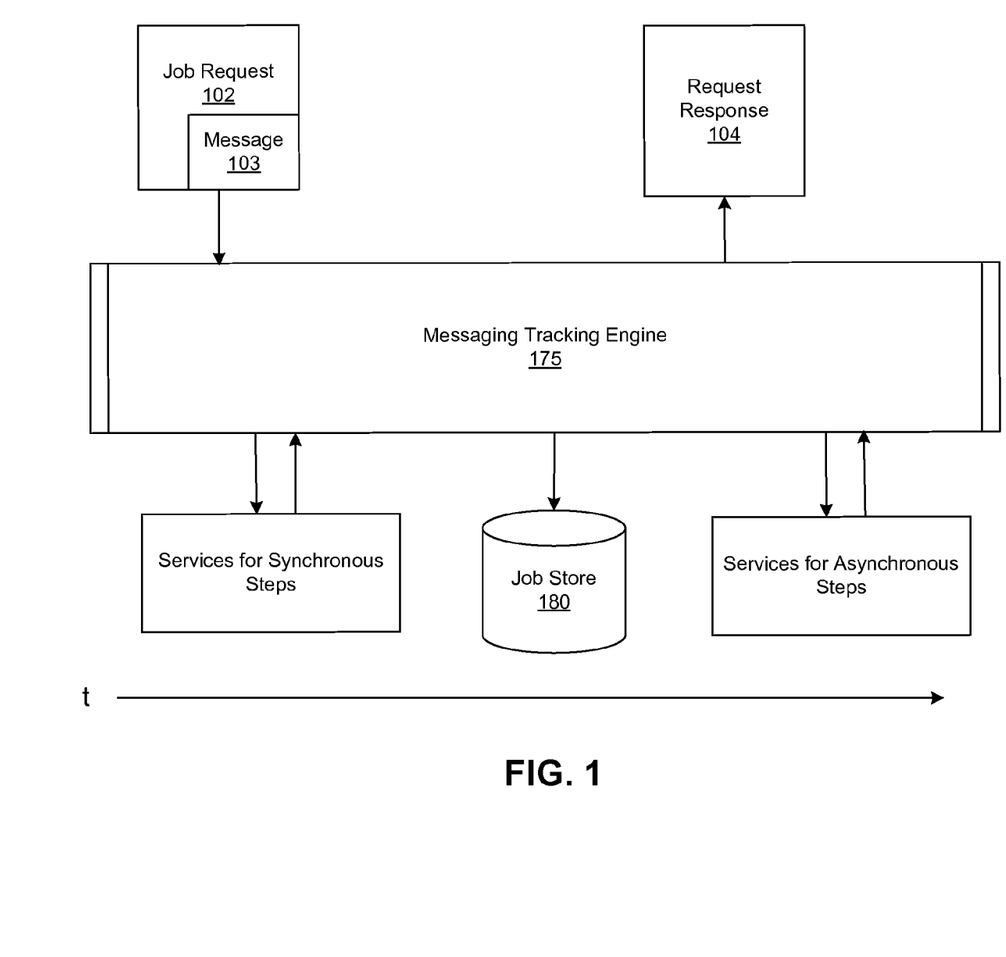
FIG. 1 illustrates a process for facilitating and tracking the processing of a message through a workflow by a message tracking engine, in accordance with an embodiment of the invention.

FIG. 1 illustrates a process for facilitating and tracking the processing of a message by a message tracking engine 175. In FIG. 1, a job request 102 is received by the message tracking engine 175 from a client device. As shown in FIG. 1, the job request may include a message 103. The message 103 may be any suitable type of message generated by a user of the social networking system 100. For example, the message 103 may be a chat message, an SMS message, an email message, a posting, and/or the like. Upon receiving the job request 102, the message tracking engine 175 determines a workflow to be used to process the message. In determining the workflow, the message tracking engine 175 may identify one or more synchronous processing steps and one or more asynchronous processing steps. After determination of the workflow, the messaging tracking engine 175 facilitates processing of the message 103 based on the one or more identified synchronous processing steps of the workflow. In particular, the message tracking engine 175 may send the message 103 to one or more services indicated by the synchronous processing steps. As the message 103 is processed, the message tracking engine 175 may track the progress of the message 103. More specifically, the message tracking engine 175 can monitor whether the message 103 is being successfully processed by the various services. In one embodiment, the message tracking engine 175 may initiate a recovery process if it is determined that the message 103 is not successfully processed by a service. After the synchronous processing steps of the workflow are completed, the message tracking engine 175 serializes the job request and the identified asynchronous processing steps in the job store 180. Thereafter, the message tracking engine 175 sends a request response 104 to the client device indicating that processing of the message has been handled. Subsequently, the message tracking engine 175 can facilitate the processing of the message 103 based on the identified asynchronous processing steps. In particular, the message tracking system can send the message 103 to one or more services indicated by the asynchronous processing steps. The message tracking engine 175 can additionally monitor whether the message 103 is successfully processed through the various services.

System Architecture

Figure 2A:
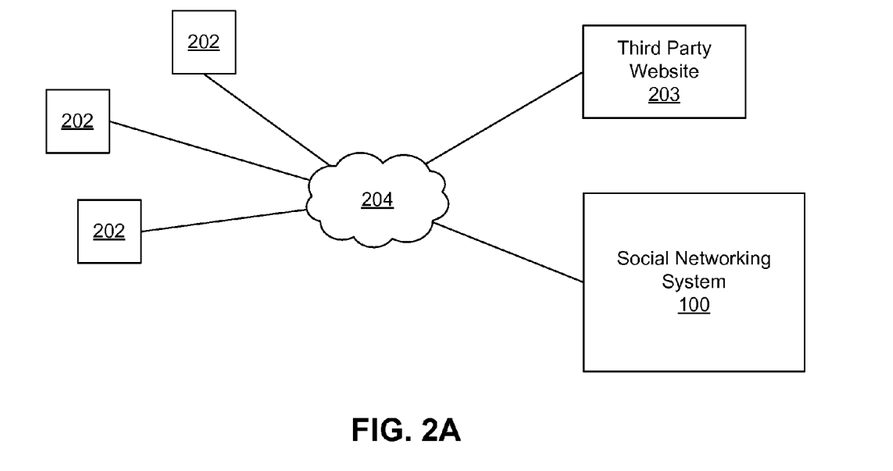
FIG. 2A is a high level block diagram illustrating a system environment suitable for operation of a social networking system, in accordance with an embodiment of the invention.

FIG. 2A is a high level block diagram illustrating a system environment suitable for operation of a social networking system 100. The system environment includes one or more client devices 202, one or more third-party websites 203, a social networking system 100, and a network 204. While only three client devices and one third-party website are shown in FIG. 2A, it should be appreciated that any number of these entities (including millions) can be included. In alternative configurations, different entities can also be included in the system.

The network 204, in general, can be any network, including but not limited to any combination of the Internet, a mobile network, a LAN, a wired or wireless network, a private network, and/or a virtual private network.

The client devices 202 include one or more computing devices that can receive user input and can transmit and receive data via the network 204. For example, the client devices 202 may be desktop computers, laptop computers, tablet computers (pads), smart phones, personal digital assistants (PDAs), or any other device including computing functionality and data communication capabilities. The client devices 202 are configured to communicate via network 204, which may include any combination of local area and/or wide area networks, using both wired and wireless communication systems. The client devices 202 can provide a means by which various users can communicate with the social networking system 100 and/or with other users of the social networking system 100. For example, a client device 202 can enable a user to send a chat message to another user. The third party website 203 is coupled to the network 204 in order to communicate with the social networking system 100.

The social networking system 100 includes a computing system that allows users to communicate or otherwise interact with each other and access content as described herein. In one embodiment, the social networking system 100 stores user profiles that describe the users of a social network, including biographic, demographic, and other types of descriptive information, such as work experience, educational history, hobbies or preferences, location, and the like. The social networking system 100 additionally stores other objects, such as fan pages, events, groups, advertisements, general postings, etc. The social networking system 100 further includes means for receiving, processing, and delivering messages received from the client devices 202.

Figure 2B:
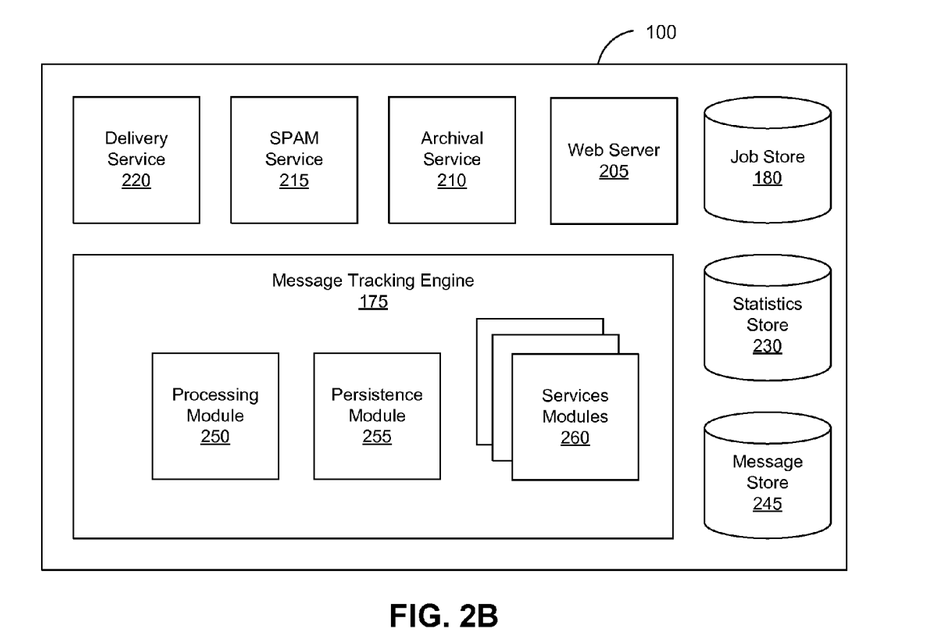
FIG. 2B is a block diagram of various components of a social networking system, in accordance with an embodiment of the invention.

FIG. 2B is an example block diagram of various components of the social networking system 100. The social networking system 100 includes a web server 205, an archival service 210, a spam service 215, a delivery service 220, a job store 180, a statistics store 230, a message store 245, and a message tracking engine 175.

In general, the web server 205 links the social networking system 100 via the network 204 to one or more of the client devices 202, as well as to one or more third party websites 203. The web server 205 may include a mail server or other messaging functionality for receiving and routing messages between the social networking system 100 and the client devices 202 or third party websites 203. The messages can be chat messages (e.g., instant messages), queued messages (e.g., email), text and SMS messages, or any other suitable messaging technique. In one embodiment, the web server 205 can receive job requests from a client device 202. Each job request may include a message that is to be processed and/or delivered. For example, a job request may include a message that is to be delivered to a friend of a user of a client device 202.

The archival service 210, SPAM service 215, and delivery service 220 are each configured to process various types of received user messages. In one embodiment, the archival service 210 may store a received message in the message store 245 for long term archival storage. The SPAM service 215 may determine whether a received message includes any unwanted or unsolicited information. The SPAM service 215 may perform such a determination using any suitable criteria and/or heuristic algorithms. The delivery service 220 may deliver a received message to a particular user of the social networking system 100. For example, the delivery service 220 may be configured to receive a chat message and deliver the chat message to a mobile phone of a user via SMS messaging. While only three services are shown, the social networking system 100 could include hundreds of different services for processing various messages. The job store 180 stores job requests received by the message tracking engine 175. The job store 180 may additionally store information regarding a set of identified asynchronous processing steps for a message. The statistics store 230 stores statistics regarding the processing of the messages handled by the message tracking engine 175.

The message tracking engine 175 centrally facilitates and tracks the processing of messages received from one or more client devices 202. In particular, the message tracking engine 175 assumes ownership of the received messages until processing of the messages have been completed. In assuming ownership, the message tracking engine 175 routes the messages to one or more services for processing. During processing, the message tracking engine 175 monitors the processing of the messages in order to ensure that the messages are successfully handled. In doing so, the inadvertent loss or dropping of messages can be avoided.

As shown in FIG. 2B, the message tracking engine 175 includes a processing module 250, a persistence module 255, and one or more services modules 260. In one embodiment, the processing module 250 facilitates and tracks the processing of received messages. In particular, the processing module 250 may receive, during operation, a job request from a client device. The job request can request that the social networking system 100 process a message included in the request. For example, a job request may request that the social networking system 100 deliver a chat message to the mobile phone of a user via SMS messaging. As another example, a job request may request that a particular email message be checked for SPAM.

After receiving the job request, the processing module 250 determines a workflow for the message. The determined workflow may indicate a particular order in which the message is to be processed. In one embodiment, the processing module 250 determines the workflow based on a type for the message and/or a type for the job request of the message. For example, the job request may request that a chat message be delivered to the mobile phone of a user via SMS messaging. Based on the type for the message (i.e., chat message) and the type of job request (i.e., SMS delivery), the processing module 250 can determine a specific workflow for processing the message. For instance, the determined workflow may require that the message be checked for SPAM, converted to an SMS format, and thereafter sent as an SMS message for delivery to a mobile phone.

As discussed, a workflow may include a series of synchronous processing steps and/or a series of asynchronous processing steps. A synchronous processing step may be a step that is to be performed prior to providing a response to the client device that sent the job request. In one embodiment, a synchronous processing step may be a step that is determined to be time sensitive. For example, the synchronous processing step may be required to be performed in a timely manner or within a specific timeframe after receipt of a job request. Illustratively, a synchronous processing step may be a step for delivering a message in substantial real-time to a user. An asynchronous processing step may be a step that can be performed after providing a response to the client device that sent the job request. In one embodiment, an asynchronous processing step may be a step that is determined not to be time sensitive. Illustratively, an asynchronous processing step may be a step for performing the storage of a message in a storage archive. Such a step may be performed a relatively long period after delivery of the message.

In one embodiment, the processing module 250 may determine the workflow for the message by selecting a processor from a set of predefined processors. More specifically, each predefined processor in the set may be a software interface that encapsulates a specific workflow for a particular type of message and/or job request. Thus, in order to determine the workflow for the message, the processing module 250 selects a processor for the message's type and/or the job request's type.

Following determination of the workflow, the processing module 250 facilitates the performance of the steps in the workflow. In one embodiment, the processing module 250 may instantiate the selected processor to facilitate the processing of the message. In one embodiment, each processor instantiated by the processing module 250 may be responsible for a single message. As such, the processing module 250 may have multiple processors processing messages at any given time. For ease in understanding, this disclosure will discuss the processing of the message in terms of the processing module 250 rather than in terms of the processor instantiated by the processing module 250.

In facilitating processing of the steps of workflow, the processing module 250 may first facilitate the performance of the determined synchronous processing steps of the workflow. In facilitating the synchronous processing steps, the processing module 250 may pass the message from one service to the next according to the order of the determined synchronous processing steps. Illustratively, the processing module 250 may initially send a chat message to a hyperlink detection service based on the ordering of the synchronous processing steps. After the hyperlink detection service has processed the message, the message may be returned to the processing module 250. Thereafter, the processing module 250 may send the chat message to a SPAM service to determine if the message includes any SPAM. Following processing by the SPAM service, the message may be returned to the processing module 250. Thereafter, the processing module 250 may send the chat message to a delivery service in order to have the chat message sent directly to a user's mobile phone.

In one embodiment, the processing module 250 additionally tracks the processing of the message by each of the services utilized by the synchronous steps. More specifically, the processing module 250 may determine whether processing of the message by each service has been successfully handled. In one aspect, the processing module 250 may make such a determination by waiting a timeout period after sending the message to a service. For example, the processing module 250 may wait a period of 20 seconds after sending a message to a SPAM service. If the service does not successfully process the message within the timeout period (e.g., the service fails to provide a response to the processing module 250), the processing module 250 may determine that processing of the message has failed. In another aspect, the processing module 250 may determine that a service has failed to successfully process a message responsive to receiving a specific response from a service indicating that processing of the message has failed.

If it is determined that processing of the message has failed, the processing module 250 may initiate a recovery process. In some instances, the processing module 250 may initiate the recovery process by re-sending the message to the service. In other instances, the processing module 250 may initiate the recovery process by sending the message to a backup or alternate service. In still other instances, the processing module 250 may move on to a subsequent synchronous processing step without having the message processed by the failing service. By tracking messages and initiating recovery processes, the processing module 250 can ensure that messages are successfully handled through a workflow even in instances where certain services in the workflow have failed.

Following completion of the synchronous processing steps, the processed message may be stored in the message store 245. Additionally, the processing module 250 may provide the job request and/or information regarding the determined asynchronous processing steps to the persistence module 255. As will be discussed, the persistence module 255 serializes the job request and/or information regarding the determined asynchronous processing steps to the job store 180. After the job request and/or information regarding the determined asynchronous processing steps are serialized, the processing module 250 sends a response to the client device that sent the job request. The response can indicate to the client device that the synchronous processing steps have been performed, and that the asynchronous processing steps will be handled.

Thereafter, the processing module 250 schedules the previously determined asynchronous processing steps. For example, the processing module 250 can schedule one or more of the asynchronous processing steps to be performed an hour after the response is sent to the client device. After scheduling of the asynchronous processing steps, the processing module 250 facilitates performance of the asynchronous processing steps based on the scheduling. In facilitating the performance of the asynchronous processing steps, the processing module 250 may send the message to one or more services based on the ordering of the asynchronous processing steps in the workflow. In one embodiment, the processing module 250 may additionally track the progress of the asynchronous processing steps and facilitate any recovery processing as needed. In one embodiment, the processing module 250 may facilitate and track the processing of the asynchronous processing steps in a manner similar to the synchronous processing steps. After completion of the asynchronous processing steps, the processing module 250 may mark or flag that processing of the job request has completed.

In one embodiment, the processing module 250 may record statistics regarding processing of the message through the entirety of the workflow. Illustratively, the processing module 250 may record the time each service takes to complete processing of the message, any instances where a service has unsuccessfully processed the message, etc. In one embodiment, the statistics for some or all of the messages processed by the processing module 250 may be aggregated. The aggregated statistics may thereafter be provided to a system operator of the social networking system 100. For example, the aggregated statistics may be provided for display on a user interface presented to the system operator. In this way, the system operator may be able to identify poorly performing services, etc.

In one embodiment, the processing module 250 may receive an indication from the persistence module 255, following a restart of the message tracking engine 175, that certain job requests have not completed. In response, the processing module 250 may facilitate performance of the uncompleted processing steps. The processing module 250 may also track the processing of the message through the uncompleted processing steps.

The services modules 260 may enable the processing module 250 to interact with the various services of the social networking system 100. More specifically, each of the services modules 260 may include API calls and/or other data usable for connecting to a service, requesting processing by the service, and/or the like. For example, a service module 260 may include an API call usable for requesting that the SPAM service 215 filter a message for SPAM. By storing API calls and/or other data for various services in the service modules 260, the message tracking engine enables the various instantiated processors of the processing module 250 to utilize a shared and centralized resource for communicating with various services. As a result, each processor instantiated by the processing module 250 does not require its own redundant code to communicate with the services of the social networking system 100.

The persistence module 255 enables job requests and/or the asynchronous processing steps associated with the job requests to be serialized to the job store 180. In one embodiment, the persistence module 255 may serialize such information on a job request journal or log stored in the job store 180. In one embodiment, the message associated with the job request may be separately serialized in the message store 245.

Figure 3:
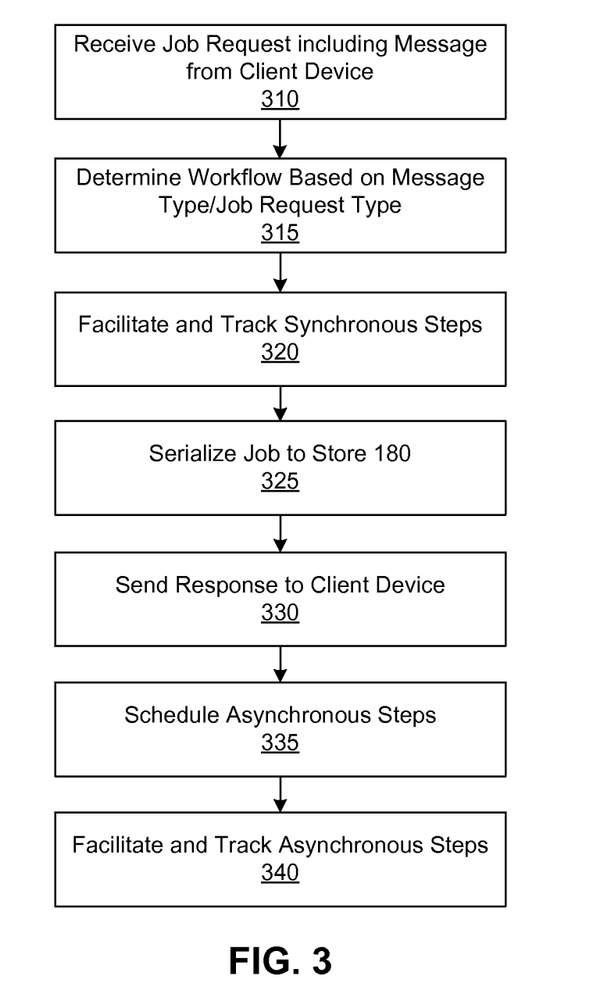
FIG. 3 is a flow chart of a process for facilitating and tracking the processing of a message through a workflow, in accordance with an embodiment of the invention.

As a result of the serializing, the message tracking engine 175 can finish uncompleted jobs after being restarted. The message tracking engine 175 may be restarted as a result of any number of different occurrences or events. For example, a power disruption may cause the message tracking engine 175 to be restarted. As another example, the message tracking engine 175 may become unresponsive. As such, a system operator may manually restart the message tracking engine 175. After being restarted, the message tracking engine 175 may perform an initial start up process. During the startup process, the persistence module 255 identifies any job requests that have not been completed. More specifically, the persistence module 255 may access and reference the job request journal stored on the job store 180. After identifying any uncompleted job requests, the persistence module 255 can initiate the performance of one or more of the remaining steps for each job request. In particular, the persistence module 255 may provide an indication to the processing module 250 of any remaining steps to be completed for each job request. Thereafter, the processing module 250 may facilitate and track the processing of the message of the job request through the uncompleted steps. It should be appreciated that as job requests are only serialized following completion of any synchronous processing steps, each of the remaining steps for the identified job request may be asynchronous processing steps. Method for Facilitating and Tracking the Processing of a Message Through a Workflow FIG. 3 illustrates one embodiment of a process for facilitating and tracking the processing of a message through a workflow. In one embodiment, the process receives 310 a job request from a client device 202. The job request can include a message, such as a chat message, an SMS message, etc. After receiving the job request, the process determines 315 a workflow based on the type of the message included in the job request and/or a type for the job request. Following determination of the workflow, the process facilitates and tracks 320 the performance of the synchronous processing steps of the workflow. For example, the synchronous processing steps may indicate a particular progression in which a message is to be processed by a first service and thereafter by a second service. Based on the steps, the process can send the message to the first service. Upon receiving a response from the first service, the process can send the now processed message to the second service for further processing. While the received message is being processed, the process can monitor the processing of the message. After confirmation that each of the synchronous processing steps has been completed, the process serializes 325 the job request and any determined asynchronous processing steps for the job request to the job store 180. After serializing the job request, the process sends 330 a response to the client device 202 indicating that the job request has been handled. Thereafter, the process schedules 335 the asynchronous processing steps for the job request. At a later time, the process facilitates and tracks 340 the processing of the asynchronous processing steps. In particular, the process can send the message to the services indicated by the asynchronous processing steps for processing. During processing, the process can additionally monitor the processing of the message.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving a job request for a message from a requestor, the message originating from a first user of a social networking system and to be directly delivered to a second user of the social networking system;
   determining, at a message tracking engine, a workflow for processing the message, the workflow specifying one or more synchronous processing steps to be performed on the message prior to delivering the message to the second user and one or more asynchronous processing steps to be performed on the message;
   routing the message to a first set of one or more services configured to perform the one or more synchronous processing steps on the message;
   responsive to a determination that the synchronous processing steps have completed, serializing the job request and information for the one or more asynchronous processing steps to a storage device; and
   following the serializing of the job request and information for the asynchronous processing steps of the workflow, routing the message to a second set of one or more services configured to perform the one or more asynchronous processing steps on the message.

2. The computer-implemented method of claim 1, further comprising:
   determining that the messaging tracking engine has been restarted;
   determining that the one or more asynchronous processing steps have not completed; and
   sending the message to at least one of the second set of services for performance of at least one of the asynchronous processing steps.

3. The computer-implemented method of claim 1, wherein determination of the workflow is based at least in part on an identified type for the message.

4. The computer-implemented method of claim 1, wherein routing of the message includes tracking the progress of the message through an ordered progression of the one or more synchronous processing steps.

5. The computer-implemented method of claim 1, wherein routing the message includes:
   determining that a service in the first set has not successfully performed at least one of the synchronous processing steps; and
   performing a recovery such that the at least one synchronous processing step is successfully performed on the message.

6. The computer-implemented method of claim 1, wherein routing the message includes:
   sending the message to a first service in the first set for performing a first synchronous processing step;
   determining that the first service has not responded after a timeout period;
   responsive to determining that the first service has not responded after the timeout period, re-sending the message to the first service for performing the first synchronous processing step;
   receiving a response from the first service that the first synchronous processing step has been successfully performed; and
   sending the message to a second service in the first set for performing a second synchronous processing step.

7. The computer-implemented method of claim 1:
   wherein the first set of services includes at least a message delivery service, and
   wherein the second set of services includes at least a message archival service.

8. The computer-implemented method of claim 1:
   wherein the message is received from a communication service associated with a first message type, and
   wherein the synchronous processing steps include a step for delivering the message to a communication service associated with a second message type, the second message type being different from the first message type.

9. The computer-implemented method of claim 8, wherein the first message type is a chat message type and the second message type is an SMS message type.

10. A computer-implemented method comprising:
receiving a message for processing from a client device associated with a first user of a social networking system, the message to be directly delivered to a second user of the social networking system;
identifying a workflow for processing the message, the workflow specifying a set of ordered processing steps to be performed on the message prior to delivering the message to the second user;
sending the message to a first service for processing according to a first processing step of the set of ordered processing steps;
monitoring processing of the message by the first service;
determining that processing of the message by the first service has failed based on the monitoring;
responsive to a determination that processing of the message by the first service has failed, performing a recovery process for the first processing step, wherein performance of the recovery process results in successful processing of the message; and
sending the processed message to a second service for further processing according to a second processing step of the set of ordered processing steps, wherein the second processing step immediately follows the first processing step in the set of ordered processing steps.

11. The computer-implemented method of claim 10, wherein determining that processing of the message by the first service has failed includes:
determining that the first service has not responded within a timeout period; and
determining that the first service has failed to successfully process the message responsive to determining that the first message has not responded within the timeout period.

12. The computer-implemented method of claim 10, wherein determining that processing of the message by the first service has failed includes receiving a specific indication from the first service that processing of the message was not successful.

13. The computer-implemented method of claim 10, further comprising storing, in a persistence storage, information for one or more uncompleted processing steps of the set of ordered processing steps, wherein the information for the uncompleted steps may be retrieved from the persistence storage in order to facilitate performance of the uncompleted steps.

14. The computer-implemented method of claim 13, further comprising:
accessing the persistence storage following a restart process;
identifying one or more uncompleted steps of the set of ordered processing steps based on the accessing; and
sending the processed message to a third service for further processing according to the one or more uncompleted steps.

15. The computer-implemented method of claim 14, wherein the one or more uncompleted steps are determined not to be time-sensitive processing steps.

16. A computer-implemented method comprising:
receiving a message from a client device associated with a first user of a social networking system, the message to be directly delivered to a second user of the social networking system;
determining, at a message tracking engine, one or more synchronous processing steps to be performed on the message prior to delivering the message to the second user and one or more asynchronous processing steps to be performed on the message;
facilitating processing of the message by a first set of one or more services, wherein the first set of services is tasked with performing the one or more synchronous processing steps;
determining that at least one service in the first set of services has failed to successfully process the message;
responsive to determining that at least one service in the first set of services has failed to successfully process the message, performing a recovery process such that the one or more synchronous processing steps are completed;
responsive to a determination that the synchronous processing steps have completed:
storing information for the one or more asynchronous processing steps to a storage device; and
sending a response to the client device indicating that processing of the message will be handled; and
following the storing and the sending, facilitating processing of the message by a second set of one or more services, wherein the second set of one or more services is tasked with performing the one or more asynchronous processing steps.

17. The computer-implemented method of claim 16, wherein performing the recovery process includes re-sending the message to the at least one service in the first set that failed to successfully process the message.

18. The computer-implemented method of claim 16, wherein performing the recovery process includes sending the message to an alternate service for the at least one service that failed to successfully process the message.

19. The computer-implemented method of claim 16, further comprising recording statistics regarding the at least one service that failed to successful process the message.

20. The computer-implemented method of claim 16, wherein determining that the at least one service has failed includes determining that the at least one service has not responded within a predefined response period.

* * * * *